Sept. 29, 1936.  A. Y. DODGE  2,055,602
LUBRICATING DEVICE
Filed Feb. 1, 1932    2 Sheets-Sheet 1
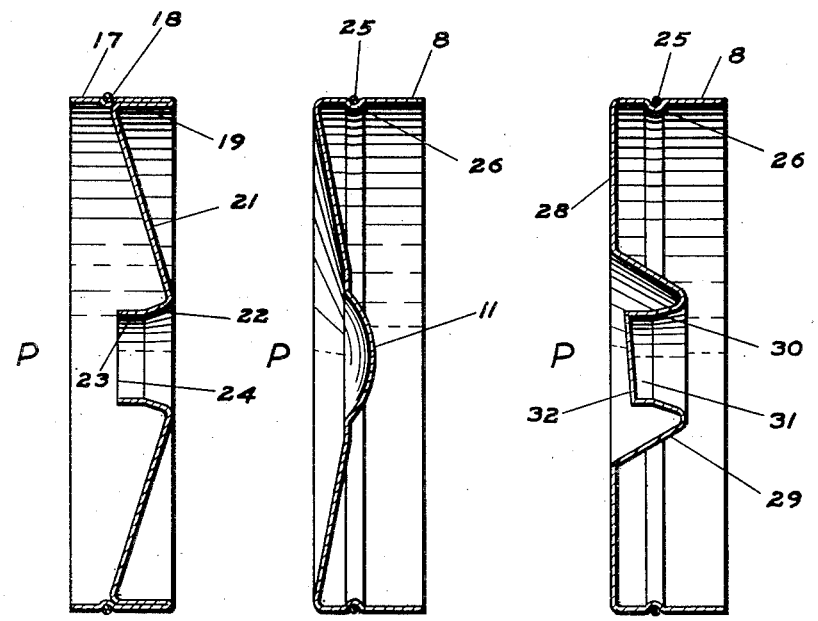
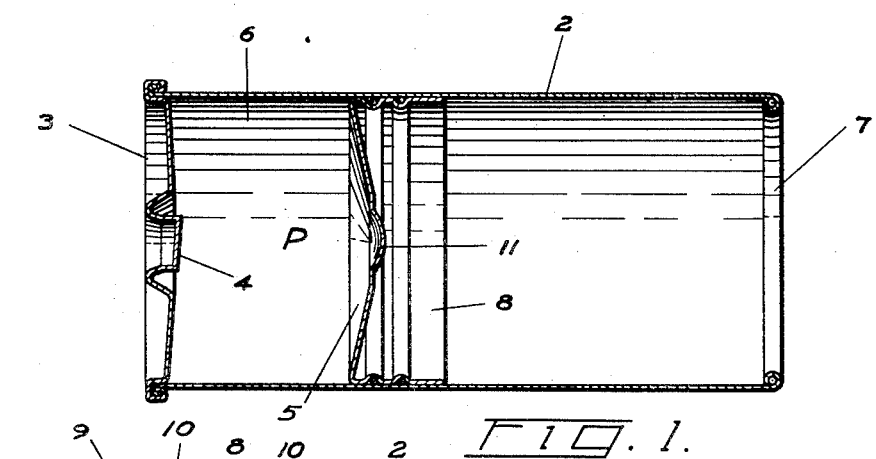
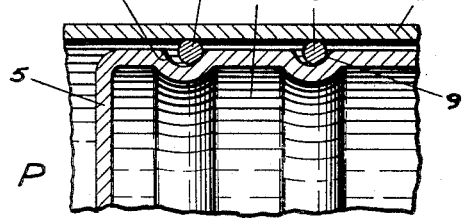
INVENTOR.
ADIEL Y. DODGE
BY
ATTORNEY.

Sept. 29, 1936.  A. Y. DODGE  2,055,602
LUBRICATING DEVICE
Filed Feb. 1, 1932   2 Sheets-Sheet 2
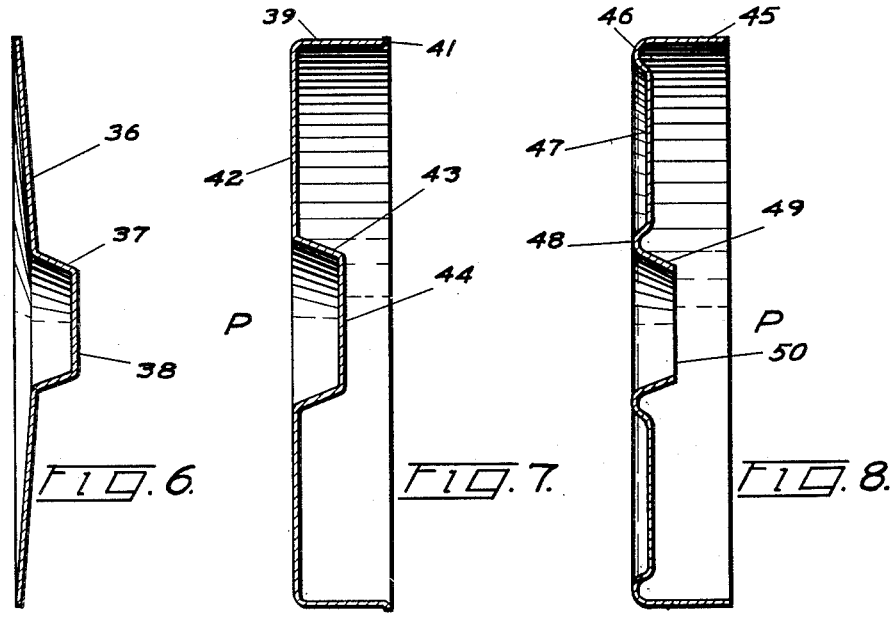
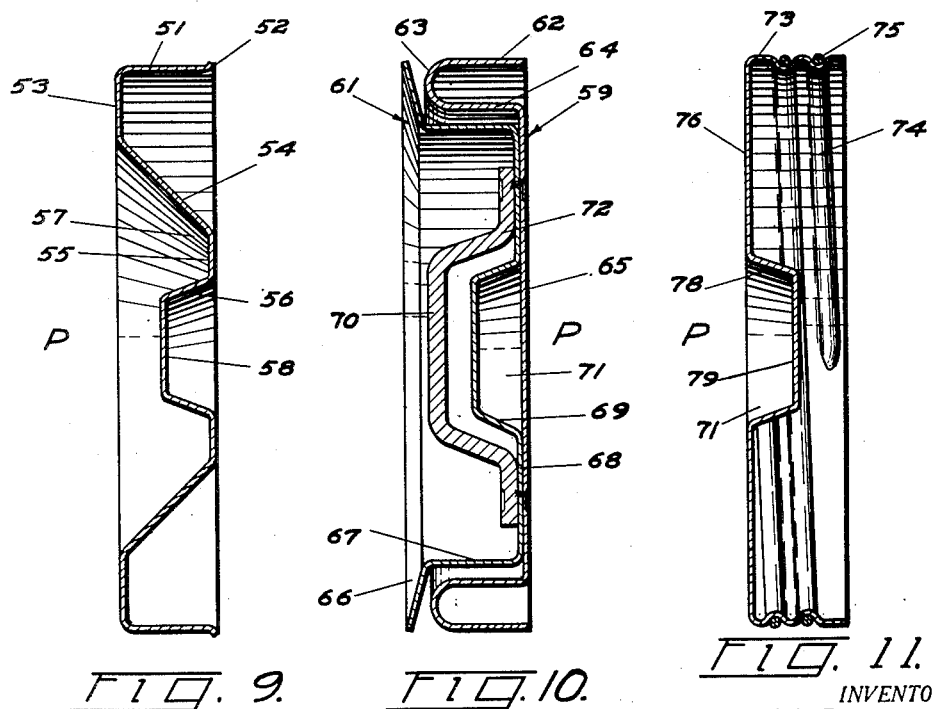
INVENTOR.
ADIEL Y. DODGE
BY
ATTORNEY.

Patented Sept. 29, 1936

2,055,602

UNITED STATES PATENT OFFICE 2,055,602

LUBRICATING DEVICE

Adiel Y. Dodge, South Bend, Ind., assignor to The Lubrication Corporation, South Bend, Ind., a corporation of Delaware Application February 1, 1932, Serial No. 590,045

9 Claims. (Cl. 221—47.3)

This invention relates to lubrication devices and more especially to pressure or follower pistons designed to be used in containers for lubricants or other relatively viscous fluids.

One of the objects of the invention is to provide pressure or follower pistons for such containers by means of which lubricant therein may be more evenly and cleanly drawn or expelled therefrom.

Another object is to provide pressure or follower pistons by means of which lubricant may be drawn or expelled from containers relatively free of entrapped air.

Another object is to provide a piston for a lubricant container having novel packing features.

Another object is to provide a piston which may be constructed of relatively light sheet metal and which is formed with integral structure for lending rigidity and strength where stresses are most likely to occur in use.

Various features of the pressure or follower pistons constructed according to my invention comprise central depressions or elevations formed in the pistons; annular depressions formed therein; integral piston skirts extending substantially parallel to the side walls of the containers within which they are disposed; and packing for the pistons designed to provide an efficient lubricant tight seal between piston and side walls of the container.

Further objects and features of the invention will be or should be apparent after a reading of the following specification and claims and after a consideration of the accompanying drawings.

In order to explain the invention more clearly, several embodiments thereof are shown in said drawings, in which:

Fig. 1 is a view in section of a container provided with the follower piston constructed according to my invention;

Fig. 2 is an enlarged fragmentary view of a part of the assembly shown in Fig. 1;

Fig. 3 is a view in section of an alternative form of piston having a lubricant outlet therethrough and flexible skirt.

Fig. 4 is a view in section of another form of piston;

Fig. 5 is a view in section of a piston of the general type illustrated in Fig. 3 but differing in certain details therefrom;

Fig. 6 is a view in section of a scraper piston;

Fig. 7 is a view in section of a piston having a scraper skirt;

Fig. 8 is a view in section of a modified form of piston of the type illustrated in Fig. 3;

Fig. 9 is a view in section of a modified piston of the type illustrated in Fig. 7;

Fig. 10 is a view in section of a piston combined with a scraper and flexible skirt; and Fig. 11 is a view in section of a piston with a modified form of packing.

In describing the devices illustrated in detail, I will hereinafter use the term "piston" but desire that, both in the description and in the claims following, the word be understood in its general sense as including both pressure and follower pistons. A pressure piston is that type of piston wherein a force greater than atmospheric pressure is applied thereto to cause piston movement, whereas a follower piston depends upon atmospheric pressure alone to cause piston movement.

I have shown in Fig. 1 a cylindrical container 2 having one end open, and having the other end closed by a head 3 having a frangible closure 4. Within the container 2 is a piston generally designated at 5 constructed of sheet metal having a concave surface on its pressure side P and an integral rearwardly extending skirt 8.

The skirt 8 has a pair of spaced apart arcuate circumferential depressions 9 in its outer wall in which packing rings 10 having a cross-sectional radius substantially less than the radius of the arcuate depressions 9 are disposed. The packing rings 10 may be formed of steel spring wire of substantially No. 14 B. & S. gauge with the ends abutting and sprung into place in the depressions 9.

The assembly shown in Fig. 1 including container and piston comprises a complete lubricant cartridge of the type which may be inserted in a lubricant feeder device to serve as a source of lubricant supply therefor. The initial position of the piston 5 as when the cartridge is received from the supplier is to the rear end of the cylinder 2 where it is held against removal from the cylinder by an inwardly formed bead 7 rolled in the rearward edge of the sheet metal of which the cylinder is constructed. The cartridge is filled by the manufacturers prior to fixing the head 3 in place, at which time the piston is at the rearward end of the cylinder 2 with its skirt resting against the bead. The head is secured in place by forming a lock seam as shown. Where the frangible closure 4 is not employed, the cartridge may be filled by introducing the lubricant through the outlet, thus causing the piston to be forced back against the bead 7 as the interior becomes filled. Some means, such as a cap, must then be used to close the outlet during shipment and handling prior to use. Lubricant may be withdrawn from the cartridge after the breaking of the frangible seal 4 in the head 3 of the cylinder through the outlet formed thereby, by suction created by the feeder gun piston with which the cartridge may be used as disclosed in my co-pending application Serial #591,535, filed February 8, 1932, in which case the piston acts as a follower piston; or pressure may be applied to the rearward end of the piston as by a spring to force lubricant out of the outlet in the head, in which case the piston acts as a pressure piston. It will be noted that a central depression 11 is formed in the concave surface of the piston so that the piston head may clear the inwardly extending part of the head 3 in which the outlet is disposed. The depression 11 also serves to strengthen the piston and further provide a guide about which the end of a coiled compression spring may be located for the purpose heretofore described.

In Fig. 2 an enlarged view of the piston packing 10 has been employed to illustrate in exaggerated detail a novel feature thereof. The piston skirt 8 need not actually bear against the side walls of the cartridge with this type of packing as the seal between piston and cylinder is effected by a wedge-like action between the packing rings 10 and the arcuate walls of the depressions 9 as the piston moves in either direction, the sealing functions becoming greater as pressure is increased. Obviously this method of piston packing may be utilized with any of the pistons shown in the remaining figures of the drawings though it is only illustrated as applied to one.

The piston illustrated in Fig. 3 includes a skirt 17 arranged parallel and concentric with the axis thereof and formed with an annular depression 18 within which a packing comprising a cotton cord is placed. The edge of the skirt extends toward the pressure side of the piston. The opposite end of the skirt is turned back upon itself to approximately the mid-point thereof as shown at 19 where it joins the body or head portion 21. An outlet 24 is formed centrally in the head 21 and defined by a conical wall 22 extending toward the pressure side which terminates in a cylindrical extension 23. Lubricant is expelled through the central opening in the piston by apparatus described in my said co-pending application by means of which pressure may be applied to the piston by end thrust against that side of the head opposed to the pressure side.

The purpose and advantage in constructing the skirt 17 of the piston so that it extends toward the pressure or lubricant side and in providing lateral support on its inner side by the turned back portion 19 is to take advantage of the relative flexibility of the sheet metal from which the piston is struck to encourage the outward flaring of the piston skirt against the cylinder wall as pressure is built up so as to insure an effective piston seal.

In Fig. 4, I have illustrated a piston which is identical to the piston illustrated in Figs. 1 and 2 with the exception that instead of employing two packing rings, I employ but one packing ring 25 which is preferably of cotton cord, the ends of which are secured together by wax to complete the ring after the cord is positioned in the depression 26. The relationship between the cross sectional radius of the packing cord 25 and the arcuate depression 26 as described in connection with Fig. 2 however, remains the same, that is the radius of the packing is less than the radius of the depression.

The piston illustrated in Fig. 5 as in the case of the piston in Fig. 3 is one wherein the lubricant may be withdrawn or forced through an outlet provided through the head. In the present instance, however, this outlet is closed by a frangible seal so that the piston may serve effectively to close one end of the cylindrical body of the cartridge with which it may be used until such time as it is required that lubricant be withdrawn therefrom. The skirt and packing of this piston is identical to that shown in Fig. 4 and like reference numerals have been used to designate like parts. The head 28 differs however, in that it is substantially flat and lies in a plane perpendicular to the axis of the piston and is formed at the central portion thereof with a rearwardly extending conical walled portion 29 which is turned back and inwardly to form an oppositely disposed conical wall 30 similar to the wall 22 of the piston shown in Fig. 3. The wall 30 merges with a cylindrical inwardly extending extension 31 having an integral closure 32 lying in a plane inclined with respect to the axis of the piston. The closure 32 comprises a frangible seal for the outlet formed by the walls 30 and 31 in that it is circumferentially scored at its periphery so as to sufficiently weaken the metal thereof, to permit the partial severing of the closure upon the application of force directed thereagainst. The purpose of the cylindrical walled portion 31 and of the corresponding portion 23 in the piston shown in Fig. 3 is to lend additional rigidity to the conical walled portions 30 and 22 respectively so that the size and shape of the conical seat so formed may not become distorted upon the forceful application of a fitting of complimentary contour such as it is contemplated shall be used for withdrawing or expelling lubricant through the piston to lubricant feeder apparatus. Uniformity of size and contour of the conical walled seat assures a lubricant tight seal with the cooperating member referred to as more fully described in my aforesaid co-pending application.

In Fig. 6 I have shown a scraper piston which, like the pistons previously described, is constructed of sheet metal and has a concave head 36 and a rearwardly extending conical walled projection 37 terminating in a flat end wall 38. The diameter of the scraper is such as to permit the relatively sharp edged periphery to contact with the walls of the container or cylinder within which the piston is disposed. The scraper piston differs from those pistons previously described in that no packing is employed and close engagement between piston and container wall is relied upon to provide the necessary seal. It is essential when using a piston of the type illustrated in Fig. 6 to provide some means for preventing it from cocking over to thus break engagement with the container or cylinder walls and for that reason it is best used in combination with a piston of the type having a skirt but without packing rings such as shown in Fig. 9, in which case the projection 37 is adapted to lie within the depression 56—58 to prevent substantial displacement of the scraper.

The piston of Fig. 7 has a skirt 39, a scraper edge 41 formed by flaring the skirt outwardly at the rearward end, a relatively flat head 42 centrally of which a depression is formed having a conical side wall 43 and a flat end wall 44.

Lubricant-tight engagement of the piston of the container walls is provided for in the scraping contact between the flare 41 and the container wall and cocking of the piston is prevented by the skirt 39 which extends close to but is not intended to actually contact with the container wall.

In Fig. 8, I have shown a sheet metal piston having a forwardly extending skirt 45 which is separated from the relatively flat head 47 by an annular depression 46 at the base of the skirt, the walls of which are contiguous with the inner skirt wall. The piston is shown in the drawings as having an outlet opening centrally located through the head 47 shown at 50 defined by a conical wall 49, the base of which is separated from the head 47 by an annular depression 48. It is intended that this type of piston shall be used in precisely the same manner as that type shown in Fig. 3 and that the skirt which extends toward the pressure side will flare outwardly under pressure to closely engage the cylinder or container walls to form a seal without the use of packing material. To facilitate the flaring of the skirt, the annular depression 46 has been provided along the line where the skirt joins the head. It is obvious that an end wall may be formed across the opening 50 if desirable in such instances where egress of lubricant through the piston is not desired.

The piston illustrated in Fig. 9 is similar to that illustrated in Fig. 7 in some respects and the scraper illustrated in Fig. 6 may be used therewith, if desired, as previously explained. This piston has a skirt 51 corresponding to the skirt 39 which is outwardly flared at its rearward end 52 so as to scrape the side walls of the cylinder or container within which it is disposed. The head 53 is substantially flat at its outer region and has an inwardly extending annular depression 57 defined by an inclined side wall 54 which joins the flat portion of the head at one end, a relatively flat annular inner wall 55 and a short conical side wall 56 having a central flat end wall 58 disposed in a plane mid-way between the opposite ends of the skirt 51. The central portion of the annular depression 52 provides at the rear end of a piston, a conical wall depression, within which an element may be introduced for applying manual or mechanically translated force to the piston or in which the projection 37—38 of the scraper of Fig. 6 may be seated when the scraper is used therewith.

In Fig. 10, I have illustrated a piston having both flexible skirt and scraper features. It is constructed of a relatively light sheet metal head 59 having a deep circumferential depression at the pressure side thereof, one wall 62 of which defines a skirt extending toward the pressure side and the opposite wall of which lies concentric with the skirt and substantially spaced apart therefrom. The bottom wall of the depression is curved as shown at 63. A scraper piston element 61 is secured to the rear face of the element 59 and comprises a rearwardly flared periphery 66, the edges of which are adapted to directly bear against the cylinder or container wall and a central portion 67 extending forwardly to occupy that region of the piston element 59 surrounded by the wall 64. The elements 59 and 61 are secured to one another by spot welding and to a bridge 70 which serves to lend rigidity to the assembly as well as to provide a contacting element for engagement with a plunger or piston actuating member where the piston is to function as a pressure piston. Under extreme pressures it is contemplated that the skirt 62 may be forced rearwardly because of its relative flexibility but limited by contact with the forward face of the flared periphery 66 of the scraper element 61 so that the wall afforded by the flaring of the skirt 62 will not be distorted. A depression 71 in the forward wall of the scraper piston 61 is provided for the purpose of lending rigidity to that element and in anticipation that the element 61 may be used alone as a follower scraper and as a separate article of manufacture.

In Fig. 11, I have illustrated a piston which is a modification of that type of piston illustrated in Figs. 1 and 2. It differs however, in that the head 76 is flat and that a depression 71 is formed centrally thereof on the pressure side defined by a conical wall 78 and flat end wall 79 corresponding to the similarly formed depression in the piston 7. The skirt 73 however, is formed with a continuous helical depression 74 extending twice around the skirt and formed with an arcuate cross-section. A helical spring of steel wire 75 having a cross-sectional radius less than the radius of the depression 74 mounted therein for the purpose of providing the piston packing which functions the same as that packing described in connection with Fig. 2 to effect a lubricant tight seal, the effectiveness of which increases with the increased pressure.

In general, I have described ten different piston constructions in the foregoing pages which may be classified as follows:

First those in which structure has been provided for effecting clearance of the piston head against contact with centrally located extensions on the inner wall of the cylinder or container head as, for instance, the closure 4 shown in Fig. 1. These pistons are represented in Figs. 4, 7, 9 and 11.

Second, these pistons which rely upon the outward flaring of the skirt under pressure to increase the effectiveness of the seal between piston and cylinder wall and which are generally distinguishable by a forwardly extending skirt as shown in Figs. 3, 8, and 10. In each of these pistons, the structure at the base of the skirt is such as to facilitate flexing. As, for instance, the annular depression 56 of the piston in Fig. 8 and the substantial depression in the periphery of the piston 59 in Fig. 10.

Third, pistons wherein it is contemplated that the contents of the container-cylinder be withdrawn or expelled therethrough which have central outlet openings provided as represented in Figs. 3, 5 and 8. The application of these pistons in the art has been fully disclosed in my aforesaid co-pending application.

Fourth, pistons of the type relying upon packing rings and those which rely upon the contact of a relatively sharp edged periphery by scraping action with the cylinder or container wall as illustrated in the following groups 1, 3, 4, 5 and 11; and 6, 7, and 9 respectively.

It is to be understood that the above-described embodiments of the invention are for the purpose of illustration only, and various changes may be made therein without departing from the spirit and scope of the invention.

I claim:

1. A piston for containers for lubricants or similarly viscous fluids, formed of a sheet of metal having an outer skirt substantially parallel to the axis thereof, said skirt having its edge extending away from the pressure side of the piston, having an annular depression formed on the pressure side, and having a projection provided with a frangible top extending toward the pressure side.

2. A piston for containers for lubricants or similarly viscous fluids, comprising a dished head and a peripheral skirt extending substantially parallel to the piston axis in the same direction in which said head is dished, there being a depression centrally of the concave side of said dished head formed with a generally circular peripheral outline.

3. A piston for containers for lubricants or similarly viscous fluids, formed with a flange substantially parallel to the axis thereof, said skirt having a plurality of grooves formed therein, and a soft annular packing in each of the grooves presenting curved outermost surfaces for sealing engagement with the inner wall of the container, each packing having a cross-sectional diameter substantially smaller than the width of its corresponding groove.

4. A piston for containers for lubricants or similarly viscous fluids, having a skirt formed with an arcuate groove encompassing the outer side wall, and a hard packing disposed in said groove, said packing being round in cross-section and having a cross-sectional radius less than the cross-sectional radius of said arcuate groove.

5. A lubricant apparatus comprising a container, a piston in said container, said piston being formed with a skirt substantially parallel to the side walls of the container, the skirt being formed with an arcuate groove, and a packing having a radius substantially smaller than the radius of the groove inserted in said groove, the differences in radii between a cross section of the packing and of the groove being such as to encourage the wedging of the packing between the walls of the piston groove and of the container as the piston is moved relative to the container.

6. A piston for containers for lubricants or similarly viscous fluids, having a skirt formed with an arcuate groove encompassing the outer side wall, and a packing disposed in said groove, said packing being round in cross section and having a cross-sectional radius less than the cross-sectional radius of said arcuate groove.

7. A piston for a container for lubricants or other similarly viscous fluids, formed with a skirt substantially parallel to the longitudinal axis of the piston, said skirt having a circumferential groove in the outer wall thereof and of varying depth parallel to the axis of the skirt, and a packing ring located in said groove presenting a curved outer surface for engagement with the container wall, said ring being of lesser width than said groove whereby the ring may shift bodily in the groove.

8. A piston for a container for lubricants or other similarly viscous fluids, formed with a skirt substantially parallel to the longitudinal axis of the piston, said skirt having a circumferential depression in the outer wall thereof presenting a curved packing receiving wall, and a packing ring located in said depression and normally disposed and bearing normally upon the central portion and free of engagement with the lateral portions of said packing receiving wall, said packing presenting a curved outer surface extending beyond the outer wall of said skirt for engagement with the wall of said container.

9. A piston for containers for lubricant or similarly viscous fluids, said piston presenting a head having an unbroken wall and formed on the pressure side thereof with a concave surface and a depression located in said concave head surface at the mid-point thereof, said depression having a circular peripheral outline.

ADIEL Y. DODGE.